(12) United States Patent
Hanson et al.

(10) Patent No.: US 6,213,259 B1
(45) Date of Patent: Apr. 10, 2001

(54) DEVICE, METHOD AND SYSTEM FOR CONTROL OF AN ELECTRICALLY POWERED PARKING BRAKE

(75) Inventors: John Hanson, Bloomfield Hills; Daniel R. Mercer, Clarkston, both of MI (US)

(73) Assignee: Dura Automotive Systems, Inc., Rochester Hills, MI (US)

( * ) Notice: Subject to any disclaimer, the term of this patent is extended or adjusted under 35 U.S.C. 154(b) by 0 days.

(21) Appl. No.: 09/217,807

(22) Filed: Dec. 22, 1998

Related U.S. Application Data (60) Provisional application No. 60/075,883, filed on Feb. 25, 1998.

(51) Int. Cl.[7] ............................................. F16D 65/36
(52) U.S. Cl. ........................ 188/156; 188/158; 192/219.4
(58) Field of Search .................... 188/2 D, 156, 188/158, 171; 192/219.4; 74/482, 501.5 R, 502.4

(56) References Cited

U.S. PATENT DOCUMENTS

| | | | |
|---|---|---|---|
| 4,281,736 | 8/1981 | Lizzio | 180/271 |
| 4,561,527 | 12/1985 | Nakamoto et al. | 192/4 |
| 4,629,043 | 12/1986 | Matsuo et al. | 192/4 |
| 4,795,002 | 1/1989 | Burgei et al. | 188/2 |
| 4,817,463 * | 4/1989 | Cameron | 74/781 R |
| 4,865,165 | 9/1989 | Taig | 188/156 |
| 4,892,014 * | 1/1990 | Morell et al. | 74/866 |
| 4,895,227 * | 1/1990 | Grenier et al. | 188/173 |
| 5,004,077 * | 4/1991 | Carlson et al. | 188/2 D |
| 5,086,662 | 2/1992 | Tayon et al. | 74/501.5 R |
| 5,180,038 | 1/1993 | Arnold et al. | 188/171 |
| 5,417,624 * | 5/1995 | Weissbrich et al. | 188/2 D |
| 5,485,764 | 1/1996 | Sugimoto et al. | 74/535 |
| 5,542,513 | 8/1996 | Reyes | 192/9 |
| 5,590,744 | 1/1997 | Belmond | 188/265 |

* cited by examiner

*Primary Examiner*—Christopher P. Schwartz
(74) *Attorney, Agent, or Firm*—Porter, Wright, Morris & Arthur (57) ABSTRACT

An electrically powered parking brake and a system and method for controlling and operating the parking brake, both during parking and during vehicle operation. The parking brake includes an electronic control module determining the amount of tension in the cable as a function of current drawn by an electric motor and a feature that allows determination of the distance traveled by the brake tensioning cable upon release of the brake. The brake is operable during vehicle motion using a modulated mode. Other features include use of a screw mechanism for cable tensioning, automatic adjustment of the brake in response to brake wear, and sensing of vehicle transmission position and vehicle speed for use in conjunction with modes of operation.

26 Claims, 7 Drawing Sheets

DEVICE, METHOD AND SYSTEM FOR CONTROL OF AN ELECTRICALLY POWERED PARKING BRAKE

This application claims priority pursuant to 35 U.S.C. 119 to applicant's copending application under 35 U.S.C. 111(b), titled CONTROL SYSTEM FOR AN ELECTRICALLY POWERED PARKING BRAKE having provisional application U.S. Ser. No. 60/075,883 filed Feb. 25, 1998.

FIELD OF THE INVENTION

The present invention relates to an electrically powered parking brake and particularly to a method and system for controlling and operating a parking brake using an automatic adjustment feature and current limiting for determining brake cable tension.

BACKGROUND

Almost all vehicles have a parking brake mechanism, and most of these vehicles have a hand lever or foot activated lever for actuating the parking brake mechanism. Typically, these levers are attached to a cable that causes displacement of the cable and operation of the attached parking brake mechanism. There is a need to provide an electrically actuated cable mechanism that operates reliably with a minimum number of parts and has a low cost, so that manual lever actuated mechanisms may be replaced or easily selectively replaced.

It is known in the art to provide electric motor-driven brake systems. Examples of conventional technology in the motor-driven brake systems art are described in U.S. Pat. Nos. 4,795,002 to Burgei et al.; 4,865,165 to Taig; 5,590,744 to Belmond; 4,281,736 to Lizzio; 4,629,043 to Matsuo et al; 4,561,527 to Nakamoto et al; 5,180,038 to Arnold et al.; 5,485,764 to Sugimoto et al; and 5,542,513 to Reyes.

U.S. Pat. No. 5,485,764 to Sugimoto et al. describes a parking brake system for a vehicle that includes a unidirectional connecting member, such as a ratchet, that interconnects a brake operating member for manual operation of the parking brake and an automatic drive source for operating the parking brake. The device of Sugimoto suggests use of motor torque in brake application, but does not provide details by which use of motor torque can be economically measured.

U.S. Pat. No. 5,542,513 to Reyes describes an automatic parking brake that includes a second solenoid that activates the solenoid for the starter motor to engage a gear to activate the parking brake through the ignition switch. In addition, Reyes describes use of a mechanical tensioning limit device for controlling the tension of parking brake application. A problem with the use of tension limit switch in the cable, as described, is that this approach introduces unnecessary cost and complexity.

Prior art relating to setting travel using travel limit switches is ineffective, as the correct released state is not a fixed position, but a specified residual tension. It is also known to provide a mechanical tension limit feature for applying brakes, but no prior art exists in conjunction with these systems to control the released position of the brakes.

It is thus clear that conventional electrically powered parking brake systems lack effective controls for applying and releasing the brake and that these existing systems are relatively complex and costly. There is a need in this art for an electrically powered parking brake system that is reliable, self-adjusting in a relatively simple and reliable manner, cost-effective, uses a simple screw and drive tube assembly, and does not rely on additional mechanical activation, such as spring, or a complicated device or system for tension control and operation. There is a further need for a control system for an electrically powered parking brake system that produces a repeatable output within a relatively narrow range, in a manner sufficient to guarantee a level of braking, but not great enough to cause damage to associated components or require that the components be over-designed. There is a further need for a control system that relies upon a reliable and economical method and system for controlling the application of a parking brake, such as by use of motor current draw, which is proportional to output torque and sufficiently independent of other variables.

SUMMARY OF THE INVENTION

It is an object of the present invention to overcome the problems of the prior art by providing a vehicle electrically powered parking brake that is automatically self-adjusting.

It is a further object of the present invention to provide a vehicle electrically powered parking brake that uses a mechanism that is not easily reversible, such as a screw mechanism, for engagement.

It is a further object of the present invention to provide a vehicle electrically powered parking brake that allows brake modulation for application during movement of the vehicle is in motion.

It is a further object of the present invention to provide a vehicle electrically powered parking brake that provides simple and effective controls for apply and release.

It is a further object of the present invention to provide a vehicle electrically powered parking brake that is simple, reliable, and inexpensive.

It is a further object of the present invention to provide a vehicle electrically powered parking brake that employs a high speed electric motor and a reaction conduit system.

It is a further object of the present invention to provide a control system utilizing a reliable and economical system variable for determining the cable tension for brake application. It is a further object of the present invention to provide a control system that utilizes motor current draw for reliable and economic brake application.

It is a further object of the present invention to provide an electrically powered parking brake system that operates in conjunction with a conduit reaction system.

It is a further object of the present invention to provide an electrically powered parking brake system that is easily installable in a vehicle.

The present invention solves the problems associated with conventional vehicle electrically powered parking brake designs and methods of operation by providing an electrically powered parking brake system that employs a high speed electric motor and use of a mechanism that is not easily reversible, such as a screw mechanism, in conjunction with a reaction conduit system. An example of a reaction conduit system that provides a force sufficient to engage the parking brake (e.g., to cause a brake pad to contact a brake drum or disc) is disclosed in U.S. Pat. No. 5,086,662, which is hereby incorporated by reference. Conduit reaction systems are also available commercially on motor vehicles.

The system of an embodiment of the present invention comprises an electric motor/gear train assembly having a line screw that is operatively connected to a drive tube. One end of a wire rope or strand is connected to the drive tube and the other end to the aforementioned reaction conduit system. The electric motor assembly is attached to a strut wherein the drive tube is free to move within the strut. The strut is attached to a vehicle at any expedient location.

In an embodiment of the present invention, an electronic control module that has an electrical connection to the electric motor controls operation of the electric motor and, in turn, movement of the drive tube. Moving the position of the drive tube either increases or decreases tension upon a wire rope or strand cable. When applying the parking brake, the tension within the strand is determined by monitoring the applied current of the electric motor. The parking brake is released by reversing the electric motor a defined distance (irrespective of the applied brake position) using an electronic positioning feature, such as a Hall Effect sensor and a magnetic pickup wheel.

Using the system of an embodiment of the present invention in combination with a conduit reaction cable system serves several purposes, including the following: 1) the present invention permits use of a commercially available and cost-effective electric motor of a small size; 2) the present invention reduces by a factor of two the reduction gearing necessary to take advantage of the motor characteristics and reduces by a factor of two the additional travel (and resulting length) of the mechanism required to provide the slack for installation during vehicle manufacture; 3) the present invention reduces from two to one the number of holes through the vehicle floor-pan or platform that are needed to locate the mechanism within the vehicle cabin, thereby reducing weatherproofing expenses; and 4) the present invention introduces a variable asymmetry to the cable arrangement, allowing off-center positioning and cable bends having larger radii.

An embodiment of the present invention includes an automatic control system for determining the correct degree of brake application. The automatic system also permits controlled application of the parking brake. The automatic control system of the present invention produces a repeatable output within a relatively narrow range, which is sufficient to guarantee a level of braking, but not great enough to cause damage to associated components or require that they be over-designed.

The automatic control system controls the electric motor such that the motor current draw is proportional to output torque and sufficiently independent of other variables to be a reliable and economical method of controlling parking brake application. By using current draw to determine the amount of cable tension and, in turn, travel distance of the drive tube, the system is self adjusting (e.g., compensating for cable stretch, and brake pad wear, among other variables).

The automatic control system also controls brake release. Such control ensures that the brake is released sufficiently to guarantee the absence of brake drag, and also ensures that brake release is not to the point of allowing slack in cables. The brake is released a calibrated distance from the application point. This distance may be measured in a number of ways. In an embodiment of the present invention, brake release is determined using suitable sensing information, such as motor revolutions or counting of commutation pulses, and can include use of a Hall Effect Sensor and magnetic pickup wheel.

The combination of the two cycles (application and release), as described above, produces a self-adjusting effect that is a marked improvement over conventional systems and methods for a number of reasons. One reason is the avoidance of either brake drag or cable slack. A second reason is that, by limiting the range of operating travel to the minimum required, the response time of the system is reduced, thereby minimizing the size of motor required for acceptable operation. A third reason relates to installation: the present invention is suitable for installation during vehicle manufacture with a substantial amount of cable slack for easier connection. Upon initial application, this slack is removed and is not reintroduced upon brake release.

While the system of the present invention is useful as a parking brake, an embodiment of the present invention can also function when the vehicle is moving, as follows. The operator is provided with a variable input, the output of which controls the position of the motor through the position sensing feature described above. The use of position sensing (as opposed to current control) is necessary because the operator must be able to increase or decrease the braking effect with sensitivity. When operated in this mode, the brake returns to its starting point upon full release—there is no self-adjustment during this mode. This provides the simplest operational logic, and is acceptable so long as the brake is operated in the "Park" mode periodically. Thus, this embodiment also includes an input to the control system for a transmission position selection, but can also function with other inputs, such as sensors for vehicle motion. The parking brake of this embodiment may also be automatically initiated by the positioning of the transmission selector.

To achieve the stated and other features, advantages, and objects of the present invention, an embodiment of the invention provides a brake controller for a vehicle having a brake cable and brake, wherein the brake cable is connected to the brake such that tensioning of the brake cable effects application of the brake, comprising: an electric motor having an output shaft; a control module coupled to the electric motor for controlling the electric motor; a gear train assembly connected to the electric motor output shaft, the gear train assembly including a threaded line screw; and a drive tube having a first end and a second end, the first end of the drive tube having a threaded fitting for receiving the threaded line screw of the gear train assembly and the second end having an attachment point for attaching the brake cable to the drive tube; wherein the control module controls the electric motor such that the output shaft of the electric motor causes motion of the gear train assembly, thereby causing rotation of the threaded line screw; and wherein the rotation of the threaded line screw causes linear motion of the drive tube via the threaded fitting, and the drive tube motion causes tensioning of the brake cable.

To achieve the stated and other features, advantages, and objects of the present invention, an embodiment of the invention further provides a brake control system for a vehicle having a brake cable and brake, the brake cable being connected to the brake such that tension applied to the brake cable effects application of the brake, comprising: an electric motor having a current, the current varying with a load applied to the electric motor; a current sensor for sensing the current of the electric motor; a brake tensioner connected to the electric motor, the brake tensioner for tensioning the brake cable; and a control module coupled to the electric motor for controlling the electric motor, the control module being further coupled to the current sensor; wherein the control module effects application of the brake by controlling the electric motor such that the electric motor causes the brake tensioner to tension the brake cable; wherein the brake cable applies the brake as the brake cable is tensioned; and wherein the control module stops the electric motor upon the current of the electric motor reaching a predetermined current, the current being determined using the current sensor.

To achieve the stated and other features, advantages, and objects of the present invention, an embodiment of the invention further provides a method for operating a brake for a vehicle having a brake controller, the brake controller including an electric motor having a current, the current varying with a load applied to the electric motor; a control module coupled to the electric motor for controlling the electric motor; a current sensor for sensing the current of the electric motor, the current sensor being coupled to the control module; and a brake tensioner connected to the electric motor, the brake tensioner for tensioning the brake cable; comprising: receiving a signal to apply the brake; the control module controlling the electric motor such that the electric motor causes the brake tensioner to tension the brake cable, wherein the brake cable is tensioned, applying the brake; and the control module stopping the electric motor upon the current of the electric motor reaching a predetermined current.

To achieve the stated and other features, advantages, and objects of the present invention, an embodiment of the invention further provides a method of installing an electrically powered parking brake unit for a vehicle having a brake cable and brake, wherein the brake cable is connected to the brake such that tensioning of the brake cable effects application of the brake; and wherein the electrically powered brake unit includes a brake initiator for initiating brake application; a brake controller; an electric motor having a current, the current varying with a load applied to the electric motor; a control module coupled to the electric motor for controlling the electric motor; a current sensor for sensing the current of the electric motor, the current sensor being coupled to the control module; a position sensor is coupled to the control module for determining motion of the brake cable; and a brake tensioner connected to the electric motor, the brake tensioner for tensioning the brake cable; comprising: attaching the electrically powered brake unit to the vehicle; connecting the brake cable to the brake tensioner; and initiating brake application using the brake initiator; wherein upon initiating brake application, the control module controls the electric motor such that the electric motor causes the brake tensioner to tension the brake cable, wherein the brake cable is tensioned, applying the brake; the control module stopping the electric motor upon the current of the electric motor reaching a predetermined current; and wherein the control module controls the electric motor such that the electric motor causes a motion in the brake cable; wherein the brake is released by the motion of the brake cable; and wherein the motion of the brake cable being determined using the position sensor, such that the brake cable motion equals a predetermined motion distance for the vehicle.

Additional objects, advantages and novel features of the invention will be set forth in part in the description that follows, and in part will become more apparent to those skilled in that upon examination of the following; these features may also be learned by practice of the invention.

DETAILED DESCRIPTION

The present invention relates broadly to an electrically actuated, motor driven cable tensioning device capable of fulfilling the function of a passenger vehicle parking brake as defined by Federal Motor Vehicle Safety Standard (FMVSS) 135. Alternately, the system may be required to function as defined by FMVSS 105.

The electrically powered parking brake (EPB) system of an embodiment of the present invention includes four components: 1) a switch or switches for determining vehicle operator input and other parameters; 2) an electronic control module for delivering controlled electrical power, 3) a motor/gear unit for producing a linear motion; 4) a line screw/drive tube that responds to the linear motion and is not easily reversible; and 5) a cable system for transmitting the linear motion to the park brake arms/pads of a conventional braking system. In an embodiment of the present invention, the EPB system exerts sufficient cable tension to park the vehicle in which it is installed at its maximum rated gross vehicle weight (as required by FMVSS 135 or other relevant legislation) on a 30% slope within the range of normal vehicle build variation and normal braking system variation.

The motor unit of an embodiment of the present invention contains a permanent magnet direct current (DC) motor with an integral two-stage gear reduction. The first stage comprises a worm/helical gear combination, and the second stage comprises a threaded shaft or line screw turning within a threaded drive tube to produce the linear motion required. This unit is packaged within a case serving as a compression strut so that the core of the cable is tensionable with respect to the conduit, without any of the reaction forces being transmitted to the vehicle structure. The cable itself transmits the load to the brake arms/pads via, for example, a conventional conduit reaction system.

According to an embodiment of the present invention, the electric parking brake is a replacement for, not an addition to, a manually powered system. The present invention is also usable to obviate the need for an additional mechanism that holds and releases the load. The electric motor is engaged via reduction gearing that is designed to be incapable of being driven in the reverse direction when in an applied position.

The electrically powered parking brake of the present invention may be classified as follows, depending on the embodiment employed: a) FMVSS 135 compliant only, mounted within the vehicle interior; b) FMVSS 135 compliant only, mounted on the vehicle exterior; c) FMVSS 135 and FMVSS 105 compliant, mounted within the vehicle interior; or d) FMVSS 135 and FMVSS 105 compliant, mounted on the vehicle exterior.

While the parking brake of an embodiment of the present invention can be located at any expedient location upon the vehicle, the brake is ordinarily located within an interior region of the vehicle (e.g., trunk, spare tire compartment, behind truck seat, or other location). By locating the brake pin in an interior region, the corrosive and vibrational affects of the environment are reduced. To minimize the cost of the cables, the motor is located as close to the rear or braked wheels as possible.

The following quantitative performance measures are typical of the performance of the system for an embodiment of the present invention. These measures are not intended as limits, as each system is tailored to a specific vehicle, as described further below. Under normal operating conditions, the EPB system exerts a maximum of 350 lbf (1557 N) cable tension with 1 in. (50 mm) of cable take-up in 3 seconds without stalling the motor (these conditions do not include a dead battery or a failure of the vehicle electrical system to provide the necessary power due to other than normal variation in the vehicle electrical system, as defined within the respective vehicle electrical system specifications). This operation is based upon an electrical systems that supplies 12 volts and 35 amps. The EPB system is capable of completely releasing all applied cable tension in about one second.

In an embodiment of the present invention, the EPB system is self-adjusting and thus capable of compensating for slack or low tension in the brake cable. The system also permits easy installation during manufacture of a vehicle because it allows an untensioned cable to be attached to the vehicle, and the slack is removed by the first operation of the EPB. For example, the EPB can provide the following minimum cable take up: a) 1 in (25 mm) installation slack take up, b) 2 in (50 mm) normal cable travel; and c) 0.4 in (10 mm) self adjustment cable take up.

In an embodiment of the present invention, the EPB operates in response to input from either an operator control, such as a switch, and/or a transmission range selector. The input causes the EPB controller to supply electrical current to the motor assembly. The current causes the motor to turn the drive tube, which applies tension to the parking brake cable, and in turn increases current drawn by the motor. The current is supplied until a predetermined current level (which correlates to a predetermined cable tension) is reached, at which point the controller shuts off the supply of current to the motor. This current level is usually equivalent to a corresponding cable tension of about 350 lbf (1557 N).

In an embodiment of the present invention, for best results, the electric motor is non-reversing: the force of the tensed cable is born mechanically by the pitch of the line screw/drive tube. By utilizing a purely mechanical element, this cable tension is held indefinitely, or until an operator input is supplied to release the EPB system. During the period of time when cable tension is being held and the parking brake is not in an apply or release cycle, the current draw on the vehicle electrical system is 0 amps.

Automatic self-adjustment, according to an embodiment of the present invention, results from parking brake operation, as follows. The brake is operated by tensioning to a predetermined tightness based on current draw of the electric motor. The brake then releases a predetermined distance of travel of the cable in the release direction, in turn resulting from, for example, a predetermined number of motor rotations specific to the vehicle of installation. As the brakes of the vehicle wear, the motor simply makes more turns when tensioning to make up for the additional travel due to the brake shoe wear. Travel is automatically adjusted because the motor turns until the current draw reaches the predetermined level, regardless of brake wear, and, upon release, the same amount of travel produces the same amount of cable slack, regardless of how far the motor traveled to reach the brake apply tension.

The specified distance traveled is determined using, for example, a Hall Effect sensor and a magnetic pickup wheel attached to the electric motor, which provides information on the number of turns of the motor. These number of turns are then correlated to a distance traveled by the screw mechanism. In this way, appropriate control limits are established and continual self-adjustment is obtained.

The present invention includes a variable controller located within the vehicle interior for allowing the vehicle operator to control the electronic module. While any suitable control device can be employed, in an embodiment of the present invention, the controller comprises an illuminated indicator dial on the vehicle's instrument panel that is electrically connected to the module. (See FIG. 6.) At the completion of a brake application cycle, if and only if the aforementioned predetermined current (shut off current) has been reached, a pin in the connector on the controller is connected to a ground, such that a circuit is completed for the purpose of illuminating the instrument panel brake light. This ground does not cause the light to be illuminated with the vehicle key in the "off" position. If during a brake application cycle, shut off current is not achieved within a predetermined period of time (e.g., 5 seconds) of the operator input pulse, the controller pulses the ground to the brake light output pin to indicate a parking brake system fault (e.g., "blinking light" pulse at a rate of two pulses per second). If the EPB system is applied with the vehicle key in the "off" position, the instrument panel brake light output pin supplies the ground necessary to illuminate the brake light immediately upon the turning of the vehicle key to the "on" position.

Regardless of EPB system status or operator input, the instrument panel brake light is not illuminated with the vehicle key in the "off" position at any time. In an embodiment of the present invention, the EPB system can normally be enabled for a brake application cycle if and only if, for example, for automatic transmission equipped vehicles, the transmission range selector is in the "park" or "neutral" positions, regardless of the state of the vehicle ignition switch and key. In an embodiment of the present invention, the brake application cycle can be disabled, regardless of operator input or the state of the vehicle ignition switch or key, in any other transmission range selector position.

In an embodiment of the present invention, with a corresponding momentary input from either an operator control, such as a switch, or the transmission range selector, while in the fully applied state, the EPB system returns the cable a predetermined distance, repeatable normally within +/±0.200 in. (5 mm), at which point the controller opens the connection to ground supplied to the instrument panel brake light, thereby breaking the circuit and turning off the light. The return cycle of the EPB system is enabled at any time after a completed apply cycle, regardless of the transmission range selected or the position of the ignition switch. If, during a release cycle, the return of the cable the predetermined distance is not achieved within a predetermined time period (e.g., 5 seconds), the controller pulses the ground supplied to the brake light output pin at a predetermined rate (e.g., blinking light at two pulses per second) to indicate a parking brake system fault.

In an embodiment of the present invention, the EPB system controller ignores any operator input until the completion of the apply or release cycle in progress. At no time during operation does the EPB system draw more than 35 amps from the vehicle electrical system. The EPB system, in case of vehicle electrical system failure, retains the ability to be manually released or applied.

In another embodiment of the present invention, the aforementioned electronic control module is employed for powering the parking brake of the embodiments above, but the control module is universal in applicability, and thus may be used with other electric motor-applied parking brake systems. When such brakes are operated in an on/off mode (available in 'park' or 'neutral'), an 'ON' signal causes the motor to run until a specified load is reached, as indicated by the current draw of the motor. An 'OFF' signal causes the motor to run in the reverse direction until a specified distance has been traveled, which must be indicated by additional input.

One economically advantageous method for accomplishing the measure of motor revolutions for release according to an embodiment of the present invention is by counting commutation pulses, but this may also be accomplished by other sensing input. An advantage of measuring motor revolutions is that the reduction gearing inevitably becomes so great that imprecision in motor revolution measurement, such as a dropped count in commutation pulses, is of no practical consequence to release distance. This method of releasing the brake, however, requires that the method be applied in the presence of a known condition (e.g., a position at which the predetermined motor draw current is reached).

The combination of the two cycles above produces a self-adjusting effect. In general, this effect is also producable by any other control scheme using differing criteria for apply and release. This self-adjustment is important for a number of reasons, including the following: 1) this approach avoids both brake drag and cable slack; 2) it limits the range of operating travel to the minimum required, and thus the response time of the system is reduced, minimizing the size of the motor required for acceptable operation; and 3) with regard to installation, in this embodiment, the system is installable with a substantial amount of cable slack for easier connection; upon initial application, the slack is removed and is not reintroduced upon brake release.

In the dynamic control mode (available in any drive gear) of an embodiment of the present invention, a variable position input (also referred to as brake modulation) is provided by the driver through a knob or other control device (e.g., a switch similar to an electric window switch) and the motor is driven to a position corresponding to this input. In this way, the braking force is variable, if desired, to effect a stop while the vehicle is moving. An embodiment of the present invention further includes use of an input indication of the vehicle speed, using methods known in the art, such that this mode is only available above certain speeds (e.g., only functions when the vehicle is moving above 5 mph). In this embodiment, brake application only occurs when the operator (e.g., driver) manually provides an input to the brake (i.e., the motor applying the brake only operates when the driver, for example, is pressing the button that causes brake activation). Release of the input automatically returns the brake to the non-tensioned position in this mode.

Figure 1:
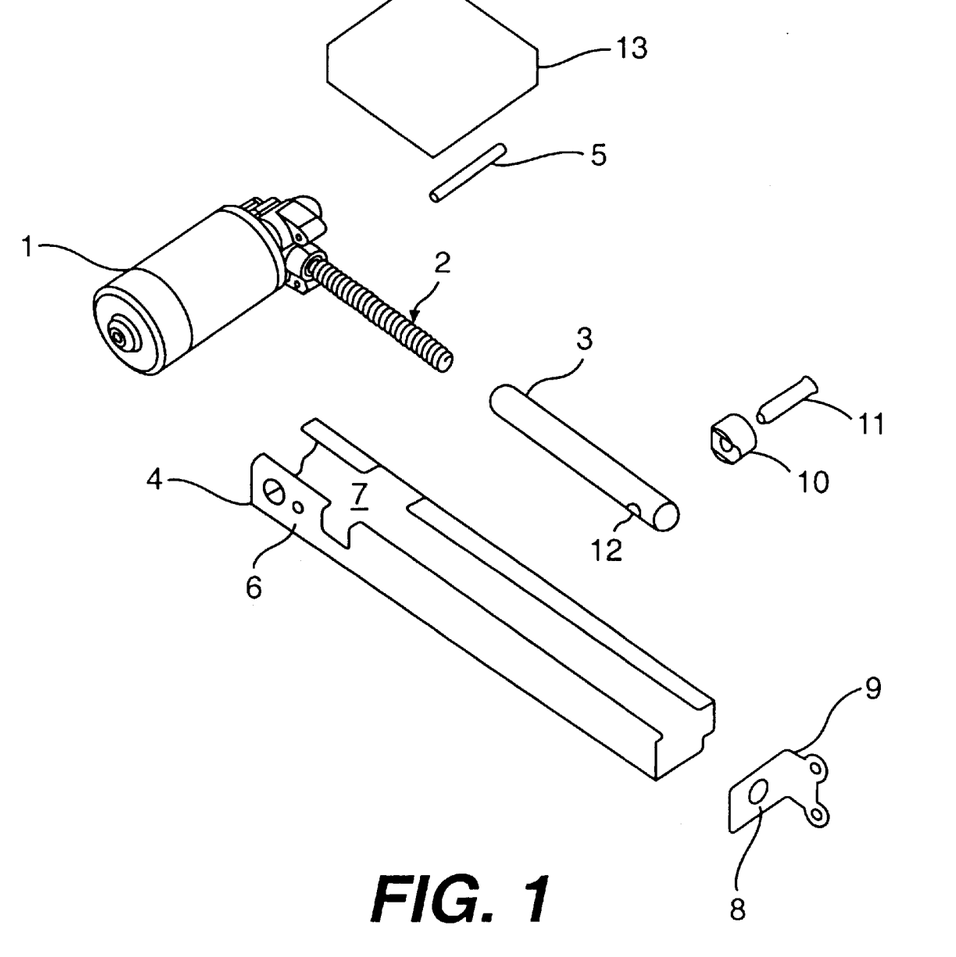
FIG. 1 is an exploded illustration of components of the inventive parking brake system of an embodiment of the present invention.

Referring now to the figures, according to an embodiment of the present invention, FIG. 1 illustrates an electric motor/gear train assembly 1 having a threaded line screw 2. While any suitable electric motor/gear train assembly can be employed, desirable results have been obtained by employing those sold commercially by FASCO Controls of Eaton Rapids, Mich., typically for the purpose of automotive seat adjustment. The externally threaded line screw 2 is received within the internal threads of a drive tube 3. A nut (not shown) is swaged onto the end of drive tube 3 for affixing the drive tube 3 onto the line screw 2.

The motor/gear train assembly 1 is affixed to a strut 4 via a roll pin 5. The strut 4 comprises an open channel structure that defines a mounting hole or holes 6. While the dimensions of the strut are tailorable to a wide range of end-uses, in one embodiment, the strut is about 270 mm in length. The motor/gear train assembly 1 is introduced into the strut 4 via a rectangular opening 7. Holes or other attaching features (not shown) on the motor/gear assembly 1 are aligned with holes 6 and a roll pin 5 is inserted through the holes 6 and the motor holes, thereby affixing the motor/gear assembly 1 to strut 4. In an embodiment of the present invention, a roll pin 5 comprises a zero clearance pin that is applied by using, for example, a "Spirol Gun". The roll pin and gun are commercially available from Spirol International Corporation of Danielson, Conn.

Figure 9:
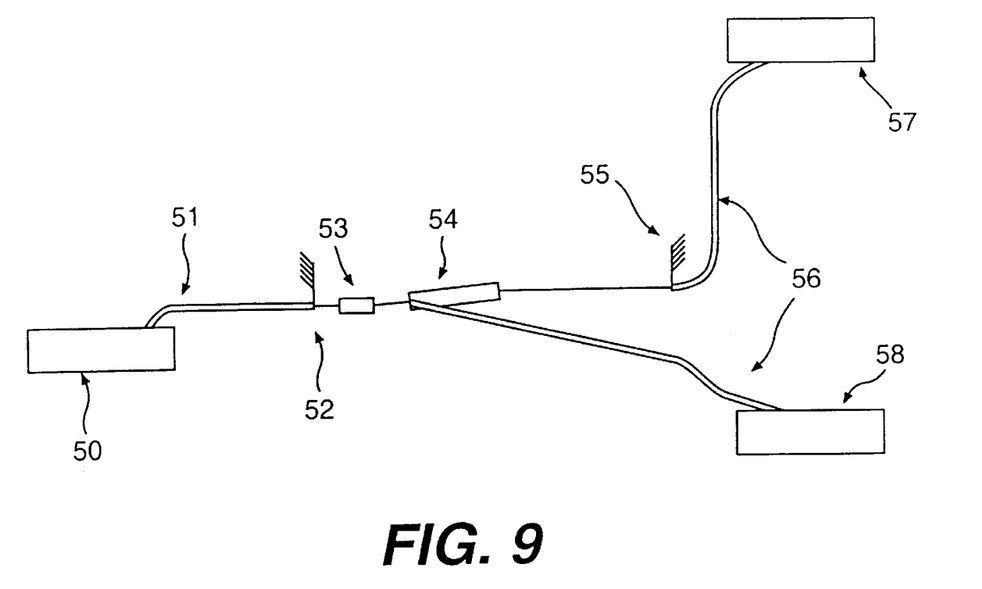
FIG. 9 shows an electrically powered braking system according to an embodiment of the present invention for use with a conduit reaction system.

An end of a wire rope or strand cable (not shown) is inserted through a hole 8 defined in an end cap 9 and the other end of the cable is attached to the previously described conduit reaction system (see FIG. 9). The end of the cable is attached to the drive tube 3 by a roller 10, which defines a hole that is concentric with the roller 10. The end of the cable includes any suitable fastener, such as an eyelet, a swaged fitting, turnbuckle, or clamp. Normally, the fastener comprises a swaged eye fitting attached to the wire rope or cable strand. The fastener is located between the drive tube 3 and roller 10. The roller 10 and fastener are affixed to the exterior of the drive tube 3 at the end of the tube 3 distal from the line screw 2 or motor/gear train assembly 1. A second roller/cable pin 11 is driven through the roller 10, the cable fastener, and into drive tube 3 at a hole 12 that is bored perpendicular to the longitudinal axis of the drive tube 3. The end cap 9 is affixed to the strut 4 using any expediter, wherein the cable is free to move through the hole 10 and within the strut 4. Movement of the cable is determined by operation of the motor/gear train assembly 1, which is controlled by control module 13.

While any suitable control module can be employed, in an embodiment of the present invention, the module includes an output produced by a Hall Effect sensor that is used for determining rotational position of the motor; the rotation of the motor, in turn, is used to determine a travel distance of the drive tube 3 produced by the rotation of the line screw 2. The control module 13 is electrically connected to the motor/gear train assembly 1 by any suitable conventional electrical connector (e.g., wire).

Figure 2:
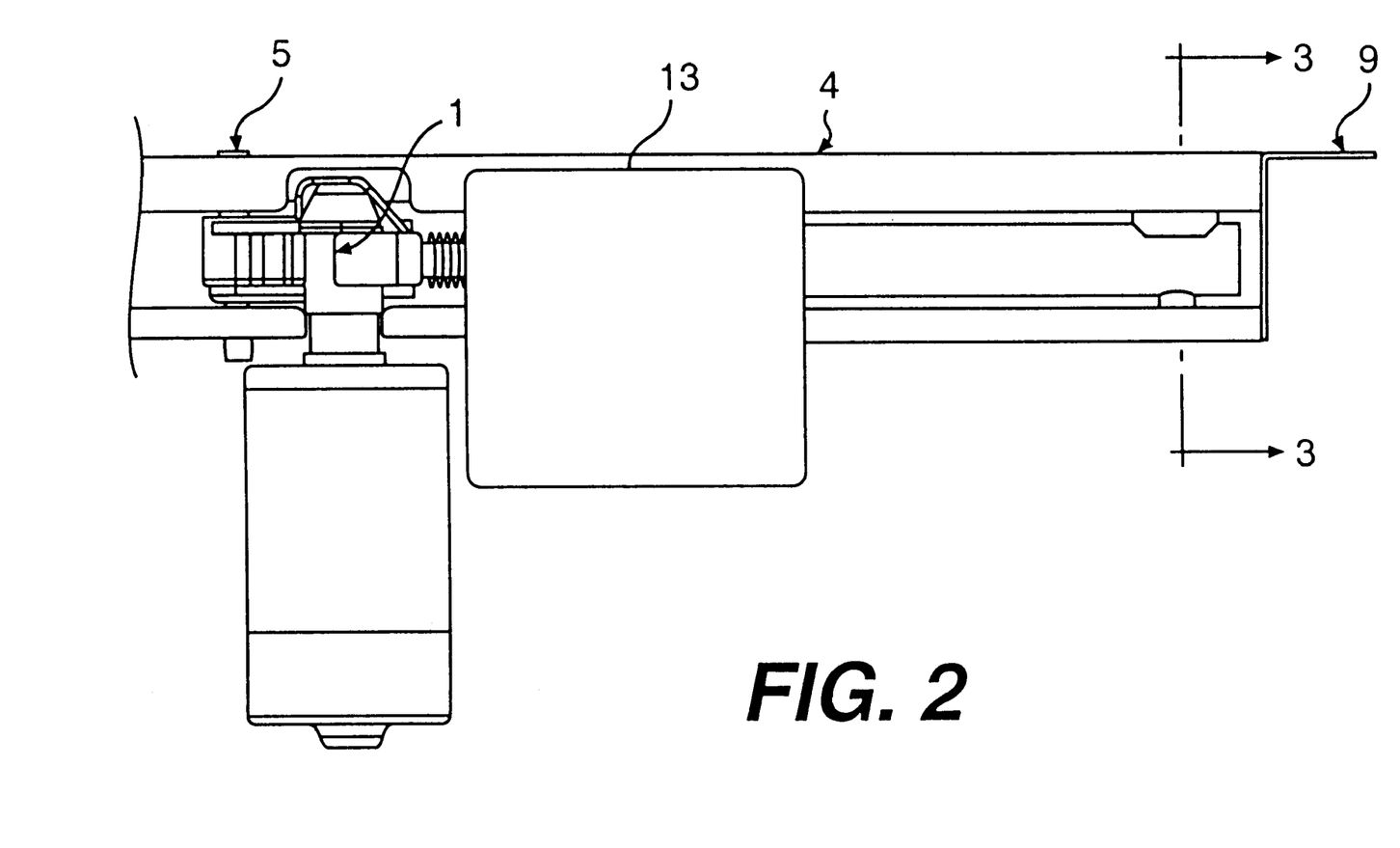
FIG. 2 is an overhead view of the assembled system illustrated in FIG. 1.

FIG. 2 illustrates the components shown in FIG. 1 in an assembled configuration. In particular, the motor/gear train assembly is located within an opening 7 and attached to the strut 4 via the roll pin 5.

Figures 3, 4:
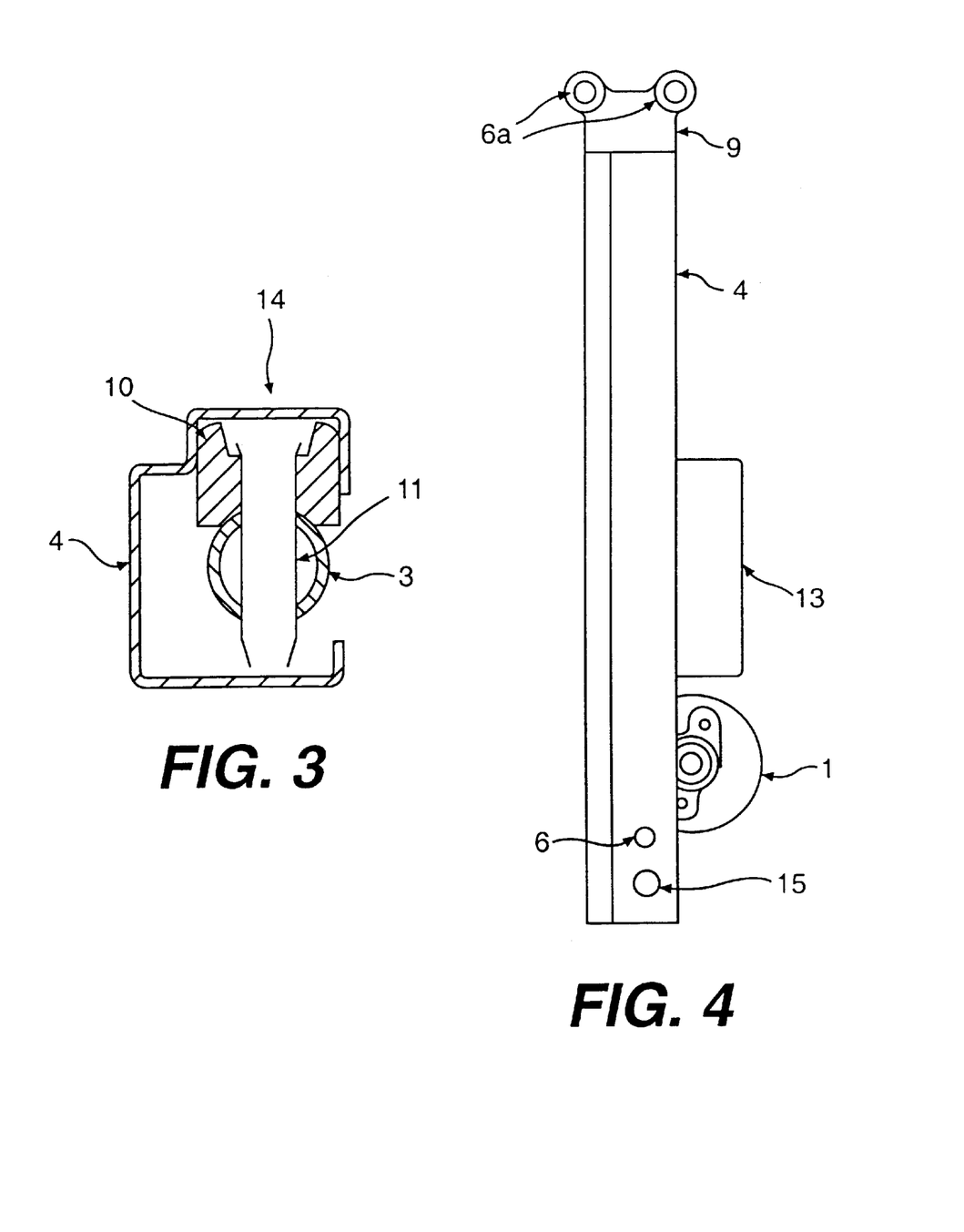
FIG. 3 is a cross-sectional drawing taken along lines 3—3 shown in FIG. 2.
FIG. 4 is a side view of the assembled system illustrated in FIG. 1.

FIG. 3 is a cross-section taken along line "A—A" of FIG. 2. FIG. 3 illustrates the roller 10 attached to the drive tube 3 via the roll pin 11. FIG. 3 also illustrates a channel 14 defined along the longitudinal axis of the strut 4. The channel 14 defines, controls, and supports the travel of the roller 8 along the strut 4.

FIG. 4 presents another view of the components of FIG. 1 in an assembled configuration (and a view of FIG. 2 rotated 90 degrees with respect to the horizontal plane, as shown in FIG. 2, and parallel to the longitudinal axis of the strut 4). In particular, FIG. 4 illustrates the motor/gear train assembly 1 mounted within the strut 4. Mounting holes 6 and 15 are defined within the strut 4 on each side of the strut 4. Hole 6 is employed for mounting the motor/gear train assembly within the strut 4, and the hole 15 is employed for attaching the EPB system to the vehicle. In an embodiment of the present invention, the EPB is also attached to the vehicle by holes 6a, which are defined within the end cap 9. The orientation of these mounting holes, as well as balanced forces within the EPB, reduce or distribute any forces applied to the vehicle when operating the EPB.

Figure 5:
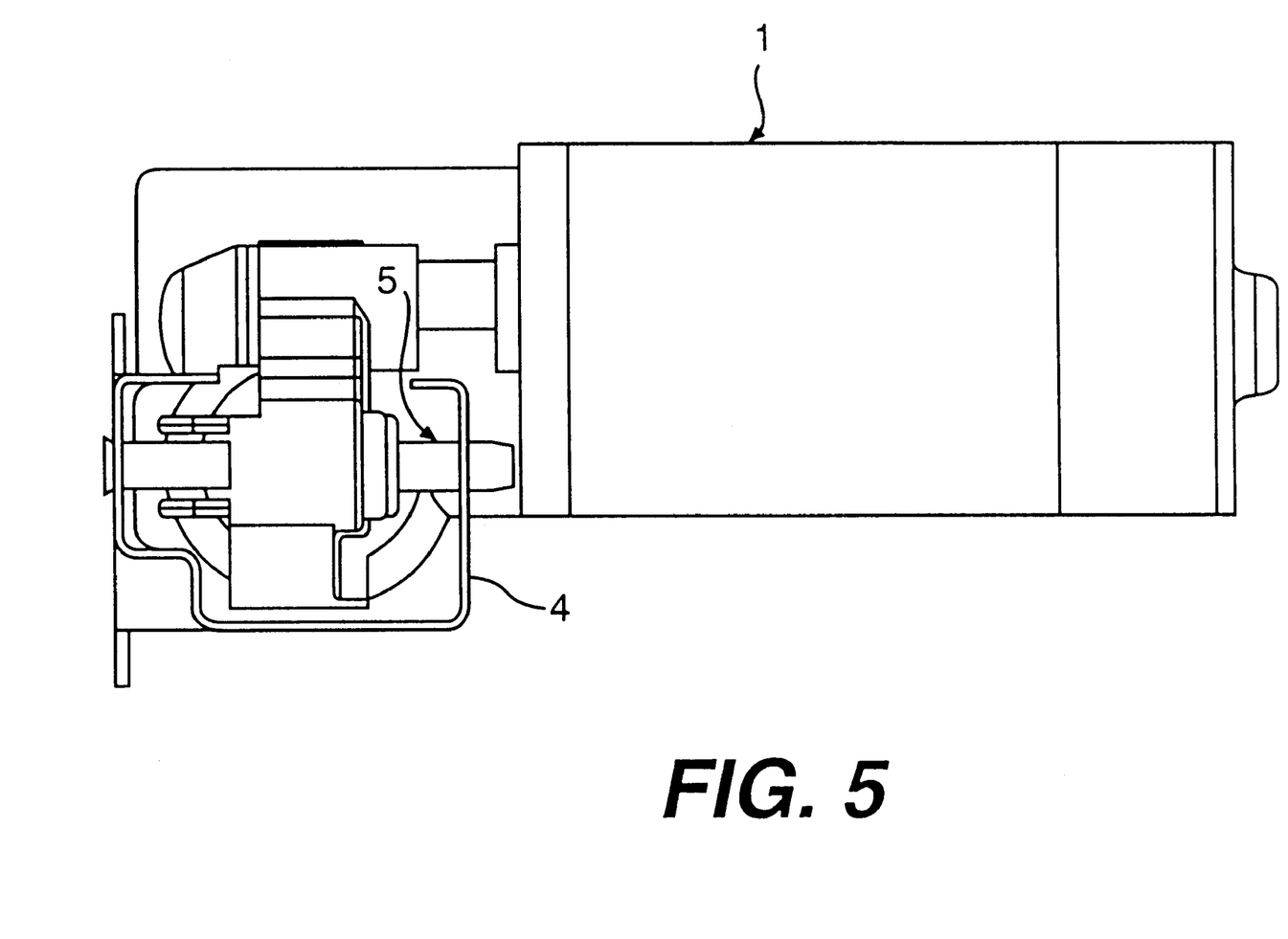
FIG. 5 is an end view illustrating the motor and gear train assembly illustrated in FIG. 1.

FIG. 5 is a further view of the components of FIG. 1 in an assembled configuration (and a view of FIG. 2 rotated 90 degrees with respect to the horizontal plane, as shown in FIG. 2, and along the longitudinal axis of the strut 4). In particular, FIG. 5 presents a view of the EPB from the end supporting the motor/gear train assembly 1. FIG. 5 better illustrates the relationship among the strut 4, the roll pin 5, and the motor/gear train assembly 1.

Figure 6:
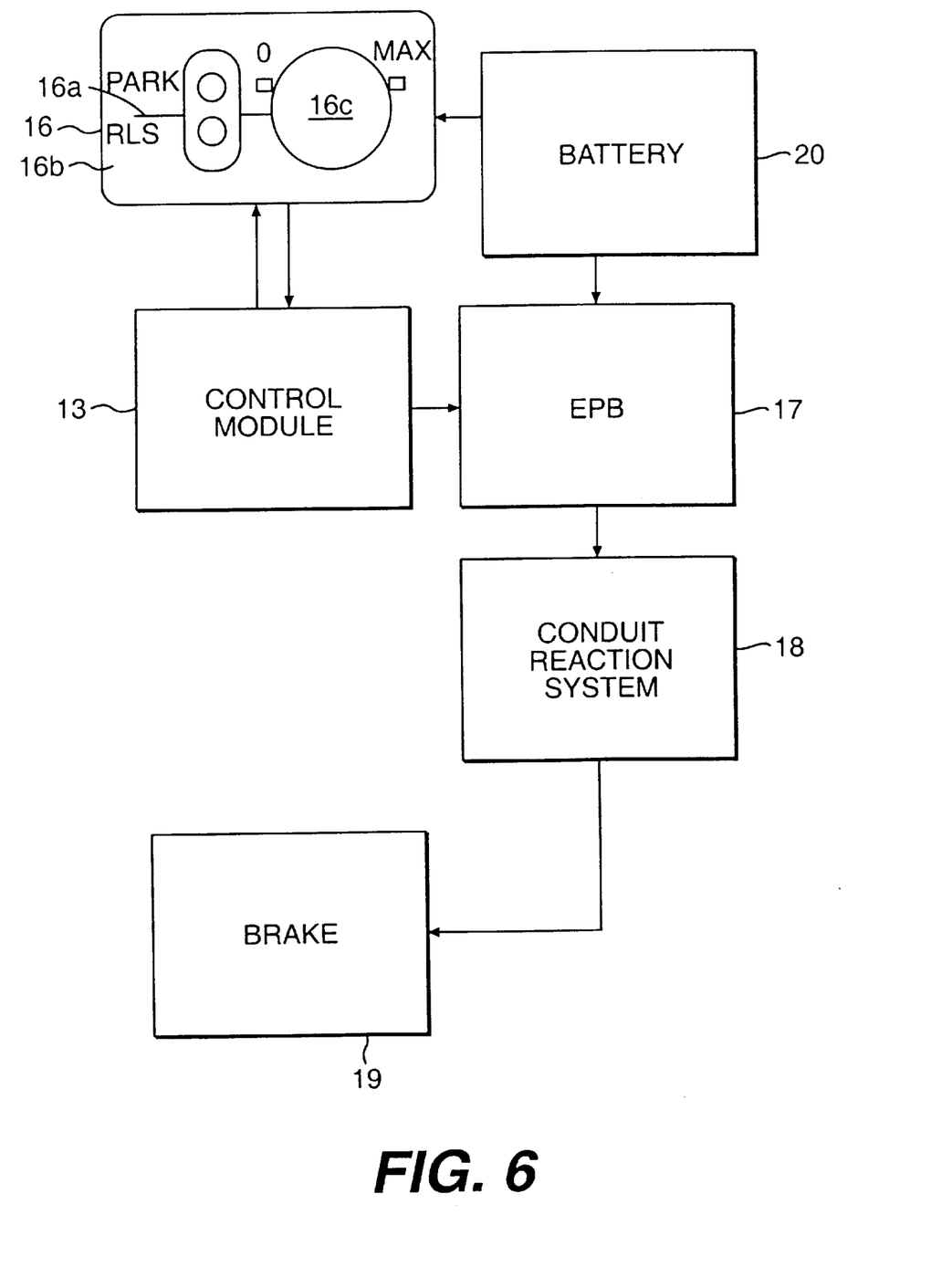
FIG. 6 is a schematic of one aspect of the electrically powered parking brake of an embodiment of the present invention that illustrates an operator input device.

FIG. 6 is a schematic flow diagram illustrating one system and device for the EPB according to an embodiment of the present invention. FIG. 6 presents the vehicle operator input device 16, which can include a switch for the parking brake having an applied ("park") 16a and a released ("rls") 16b position. The device 16 is coupled to the control module 13, such as by an electrical connection. As previously described, for applying the parking brake when the vehicle is parked or otherwise not moving above a predetermined speed, upon receiving an input 16a, the control module 13 applies the EPB 17 (such as illustrated in FIGS. 2 and 4) until a predetermined current load is detected. The EPB 17 is connected to a conventional conduit reaction system 18 (e.g., via a wire strand or cable). Movement of the EPB 17, as controlled and monitored by the control module 13 and the device 16, causes a force to be exerted through the conduit reaction system 18, which in turn causes the brake pads to contact the brake drums or discs of the brake system 19. Power for operation of the system and device of the present invention is supplied by, for example, a battery 20, such as the vehicle battery.

Similarly, when an input to release 16b the brake is provided to the device 16, in response to a signal from the control module 13, the EPB 17 releases the brake 19 a defined distance (e.g., about 2 inches) via the conduit reaction system 18. In an embodiment of the present invention, the distance of travel, and hence number of turns of the motor for release, is tailored to the vehicle in which the system is installed.

As also described above, if desired, the device 16 can also be employed to use the EPB 17 as an emergency brake by rotating a dial 16c to apply the EPB 17 in an intermittent or gradual fashion in response to input from the operator.

Any suitable conventional materials and methods can be employed for making the previously described components. While the above description places particular emphasis upon vehicle parking brake systems, the brake of the present invention is employable upon a wide range of machines or devices having parking brakes or other motion prevention devices. Further, the control module can be engaged or controlled by any conventional system or device, such as by remote keyless activation.

Figure 7:
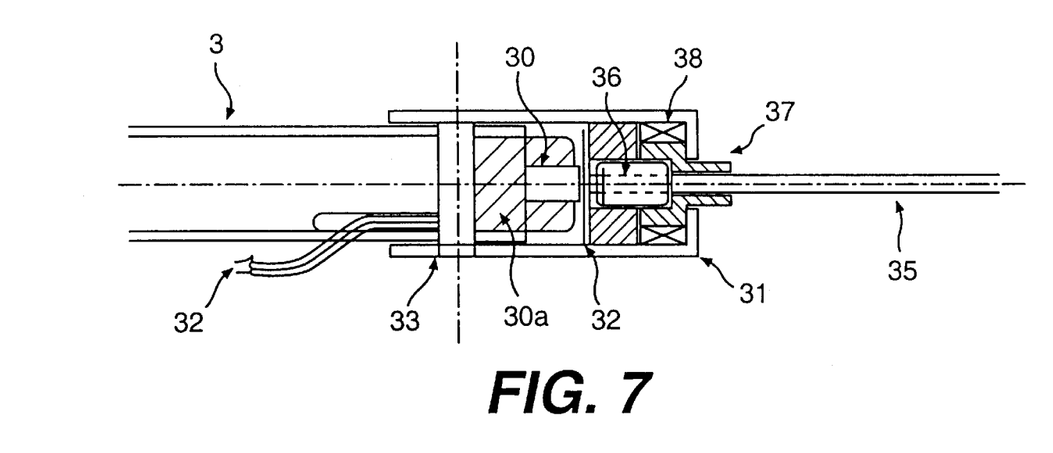
FIG. 7 presents an example of a switch and other components for control of brake cable tension according to an embodiment of the present invention.
Figure 8:
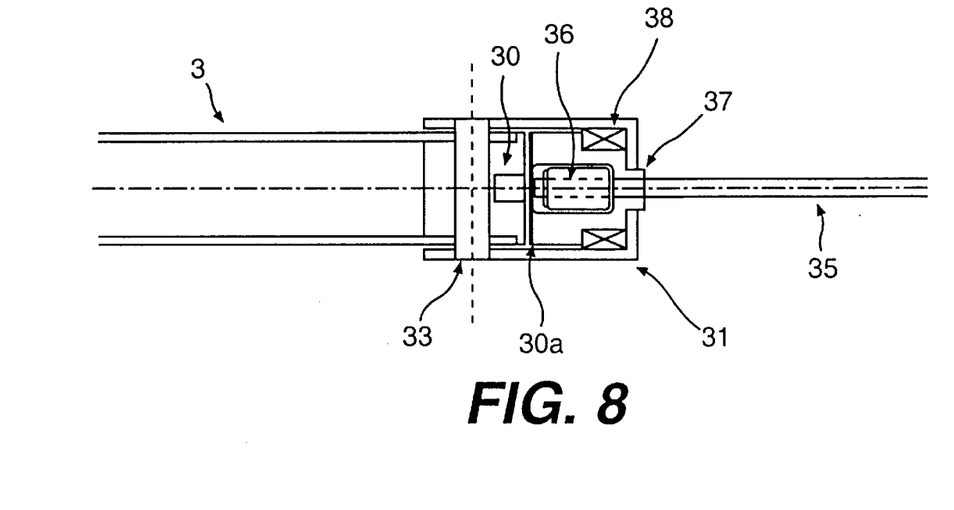
FIG. 8 presents another example of a switch and other components for control of brake cable tension according to an embodiment of the present invention.

As shown in FIGS. 7 and 8, another embodiment of the present invention includes an alternative automatic self adjustment feature for the brake. As discussed above, one adjustment parameter of the present invention is the amount of residual tension in the cable when released: too much residual tension will cause the brakes to drag; too little residual tension will allow the cables to move, creating noise and possible misalignment during future application. In the above embodiments, self-adjustment is achieved by achieving a particular reference tension using motor current draw, for example, and proper release of tension is achieved by releasing the brake a predetermined distance, as by motor reversal.

The embodiment described in FIGS. 7 and 8 relates to adjustment of tension in the case of an operating environment where the fully applied position is not frequently established (an example would be use of the brake in conjunction with a manual transmission, which does not automatically apply the brake). In this event, it is preferred to provide a control mechanism that establishes the correct released position directly.

The embodiment of FIGS. 7 and 8 has an advantage over the prior art in the event of the parking brake being operated repeatedly to only a partially applied condition. In this situation, the reference point for tensioning is established infrequently, and better control is needed to establish the release position directly.

To establish additional control for automatic adjustment, this embodiment of the present invention includes use of a switch and spring combination together with a control for stopping and reversing the motor, such that the proper tension limit is applied to the brake, and appropriate release distance by motor reversal is achieved.

FIG. 7 presents one example of a switch and other components according to this embodiment. In FIG. 7, a switch 30 in a plastic carrier 30a is housed within a cup 31. The switch 30 is connected to the control module (see FIG. 6) for motor control via wiring 32. A roll pin 33 is coupled to the cup 31 for connection with the drive tube 3. The cable 35 includes a button 36 at the end of the cable 35 for activating the switch 30. When assembled, the button 36 and the end of the cable 35 are located within a screw machined carrier 37, which, in turn, is housed within the cup 31. Also located within the cup 31 are a shim washer 32, which separates a first half of the cup 31 containing the switch 30 and a second half of the cup 31 containing the screw machined carrier 37, button 36, and a spring 38.

In operation, according to an embodiment of the present invention, tension of the spring 38 between the cup 31 and the screw machined carrier 37 presses the button 36 against the switch 30, which allows the motor (see FIGS. 1–5) to operate and tension to be placed on the cable 35. This tension on the cable 35, in turn, produces tension on the brake (not shown), causing the brake to engage. Upon full engagement, the tension in the cable 35 increases such that the tension force in the spring 38 is overcome, and the spring 38 is compressed. This compression of the spring 38 causes the button 36 to separate from the switch 30, thereby stopping the motion of the motor.

Operation of the system is thereafter similar to that for the other embodiments. If the vehicle is at rest when the brake is engaged, the brake remains fully engaged until the brake is released, upon which event the cable is moved a predetermined distance, as by a preset number of motor revolutions.

FIG. 8 presents a second embodiment of the switch device of this embodiment. This embodiment is essentially similar to the embodiment of FIG. 7, but the plastic carrier 30a fully captures the switch 30 to reduce the accumulation of tolerances in manufacturing and operation.

Figure 10:
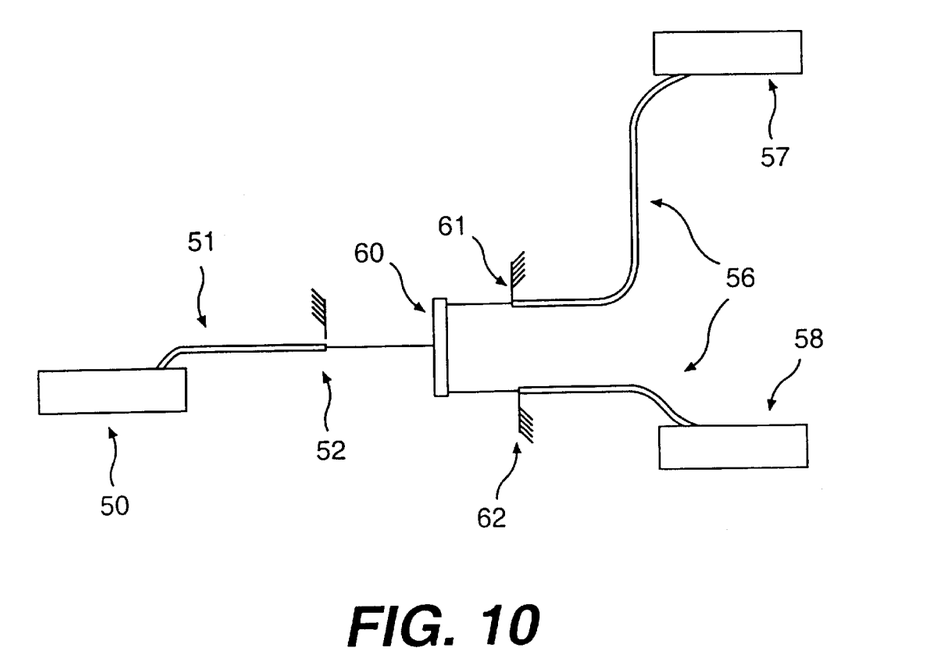
FIG. 10 is an electrically powered braking system according to an embodiment of the present invention for use with a non-conduit reaction system cable assembly.

Another embodiment of the present invention includes a specialized arrangement of components for the brake, as shown in FIGS. 9 and 10. The embodiments described above include four general components: 1) a switch or switches for determining operator intent and other parameters; 2) an electronic control module delivering controlled electrical power; 3) a motor/gear unit producing a linear motion; and 4) a cable system transmitting the linear motion to the park brake arms of a conventional braking system. The embodiments of FIGS. 9 and 10 relate specifically to the latter two components.

As described in the previous embodiments, an embodiment of the present invention includes a motor unit containing a permanent magnet DC motor with an integral two-stage gear reduction. The first stage consists of a worm/helical gear combination and the second stage consists of a threaded shaft turning within a threaded tube to produce the linear motion required. In the present embodiment, this unit is packaged within a case serving as a compression strut so that the core of the cable can be tensioned with respect to the conduit without any of the reaction forces being transmitted to the vehicle structure. The cable itself transmits the load to the brake arms via a conduit reaction bracket in a well known manner, as further shown in FIG. 9. In contrast, an embodiment presenting a brake system that does not use of a conduit reaction system is shown in FIG. 10.

The components of embodiment of the present invention shown in FIG. 9 include a motor/gear unit for producing a linear motion 50, a front cable 51, a first conduit anchor point 52, a coupler 53, a reaction bracket 54, a second conduit anchor point 55, two rear cable sections 56, and the rear brakes 57, 58. The embodiment of FIG. 10 is similar to that of FIG. 9, but does not include a coupler 53, a reaction bracket 54, and only a second conduit anchor point 55, instead using an equalizer 60 and second and third conduit anchor points 61, 62.

An embodiment of the present invention thus optimizes the design, for purposes of economy and ease of installation, of the system described in previous embodiments, and is the result of a comparison of several different alternatives for achieving the design goals. The logic behind the design of this embodiment includes the following considerations. To be economically viable, an electric parking brake must be a replacement for, not an addition to, a manually powered system. An additional mechanism that holds and releases the load is to be avoided, and these functions are accomplished by use of reduction gearing designed to be incapable of being driven in the reverse direction.

Additional cost savings is inherent in the embodiment shown in FIG. 9 by virtue of the fact that braking forces must be applied to two wheels, and a motor and two cables are generally cheaper than two motors. To further minimize the cost of the cables, in an embodiment of the present invention, the motor is located as close to the read (braked) wheels as possible. In addition, costs of the motor are reduced by using a motor that does not need to withstand the shock loads of being mounting on the wheel or a suspension member or the corrosion/abrasion environment of the vehicle underbody.

According to an embodiment of the present invention, the motor is mounted inside the rear part of the vehicle cabin, as, for example, in the trunk or spare tire area. In an embodiment of the present invention, the motor is economically designed to operate at a high speed, with reduction gearing used to obtain the necessary force or torque, and reduction being accomplished in two stages to avoid an excessively large envelope.

In the embodiment shown in FIG. 9, to apply the braking force correctly, the two cables are pulled equally within the conduit reaction system. The cable is tensioned either by a rotating drum or sector, or by a linear actuator in the form of a lead screw. In one embodiment, the latter is selected for reasons of cost and envelope dimensions. Further, a single cable attachment provides the advantage of allowing easier balancing of the load by linearly maintaining the load.

An additional advantage of this embodiment is provided by use of two-stage reduction gearing. The constraints of motor speed and torque, load to be applied, thread design, and desired speed of actuation are thus combinable in a manner that is impractical in the prior art. An embodiment of the present invention also includes an additional worm gear stage that allows operation within these constraints.

Embodiments of the present invention have now been described in fulfillment of the above objects. It will be appreciated that these examples are merely illustrative of the invention. Many variations and modifications will be apparent to those skilled in the art.

What is claimed is:

1. A brake controller for a vehicle having a brake cable and brake, wherein the brake cable is connected to the brake such that tensioning of the brake cable effects application of the brake, comprising, in combination:

an electric motor drawing a current which varies as load is applied to the electric motor and having an output shaft;

a control module coupled to the electric motor for controlling the electric motor;

a gear train assembly connected to the electric motor output shaft, the gear train assembly including a threaded line screw;

a drive tube having a first end and a second end, the first end of the drive tube having a threaded fitting for receiving the threaded line screw of the gear train assembly and the second end having an attachment point for attaching the brake cable to the drive tube;

a cable motion sensor for sensing an amount of change of position of the cable and coupled to the control module;

a current sensor for sensing the current of the electric motor and coupled to the control module;

wherein the control module controls the electric motor such that the output shaft of the electric motor causes motion of the gear train assembly, thereby causing rotation of the treaded line screw, wherein the rotation of the threaded line screw causes linear motion of the drive tube via the threaded fitting, and the drive tube motion causes tensioning of the brake cable; and wherein the control module stops the electric motor upon the current of the electric motor reaching a predetermined current when tension in the cable is increased and the control module stops the electric motor upon the cable moving a predetermined amount of change of position when tension in the cable is decreased.

2. The brake controller of claim 1, wherein the cable motion sensor comprises an output shaft position sensor; and wherein the control module determines the amount of change of position as a function of output shaft rotation.

3. The brake controller of claim 2, wherein the output shaft sensor comprises a Hall Effect sensor.

4. The brake controller of claim 1, wherein the gear train assembly includes a two-stage gear reduction integral with and directly supported by the electric motor.

5. The brake controller of claim 4, wherein the integral two-stage gear reduction comprises a worm/helical gear combination and a threaded shaft that turns within a threaded tube.

6. The brake controller of claim 1, wherein the brake controller is usable in a plurality of types of vehicles, the vehicle has a type, and wherein the predetermined amount of change of position of the cable is variably adjusted depending on the vehicle type.

7. The brake controller of claim 1, further comprising:

a switch for activating the brake controller.

8. The brake controller of claim 1, wherein the attachment point includes a roll pin, the roll pin evenly distributing loading forces on the brake controller produced by the application of the brake.

9. The brake controller of claim 1, wherein the vehicle further comprises a transmission having a plurality of transmission positions, the plurality of transmission positions including a first transmission position, the brake controller further comprising:

a transmission position sensor connected to the control module;

wherein the brake automatically actuates upon the transmission being placed in the first transmission position.

10. The brake controller of claim 1, further comprising a variable control mechanism coupled to the control module, the variable control mechanism allowing variable application of the brake.

11. The brake controller of claim 1, wherein the gear train assembly includes a worm/helical gear combination for providing gear reduction.

12. The brake controller of claim 1, wherein the control module is coupled to the electric motor by a wire for transmitting a signal from the control module to the electric motor.

13. The brake controller of claim 1, wherein the brake includes a reaction conduit system for evenly distributing brake application using a single strand for the brake cable.

14. The brake controller of claim 1, wherein the electric motor and the gear train assembly are contained within a self-contained unit and the line screw extends out of the self contained unit.

15. The brake controller of claim 1, further comprising:

a cable tension sensor.

16. A brake control system for a vehicle having a brake cable and brake, the brake cable being connected to the brake such that tension applied to the brake cable effects application of the brake, comprising, in combination:

an electric motor having a current, the current varying with load applied to the electric motor;

a current sensor for sensing the current of the electric motor;

a brake tensioner connected to the electric motor, the brake tensioner for tensioning the brake cable;

a control module coupled to the electric motor for controlling the electric motor, the control module being further coupled to the current sensor;

wherein the control module effects application of the brake by controlling the electric motor such that the electric motor causes the brake tensioner to tension the brake cable; wherein the brake cable applies the brake as the brake cable is tensioned; and wherein the control module stops the electric motor upon the current of the electric motor reaching a predetermined current, the current being determined using the current sensor; and a position sensor coupled to the control module for determining motion of the brake cable;

wherein the control module controls the electric motor so as to operate the electric motor such that the electric motor causes the brake tensioner to release the brake; and wherein the brake is released by motion of the brake cable, the motion of the brake cable being determined using the position sensor.

17. The brake control system of claim 16, wherein the electric motor causes the brake tensioner to release the brake by operating in a reverse direction from a direction of motor operation during tensioning of the brake tensioner.

18. The brake control system of claim 16, further comprising a tension sensor coupled to the control module for determining the tensioning of the brake cable, the tension sensor determining a threshold tension; wherein the control module controls the electric motor such that the electric motor causes the brake tensioner to apply the brake; and wherein the control module stops the electric motor upon the tensioning of the electric motor reaching the threshold tension, the reaching of the threshold tension being determined using by the tension sensor.

19. A brake controller for a vehicle having a brake cable and brake, wherein the brake cable is connected to the brake such that tensioning of the brake cable effects application of the brake, comprising, in combination:

an electric motor having an output shaft;

a control module coupled to the electric motor for controlling the electric motor;

a gear train assembly connected to the electric motor output shaft, the gear train assembly including a threaded line screw;

a drive tube having a first end and a second end, the first end of the drive tube having a threaded fitting for receiving the threaded line screw of the gear train assembly and the second end having an attachment point for attaching the brake cable to the drive tube;

wherein the control module controls the electric motor such that the output shaft of the electric motor causes motion of the gear train assembly, thereby causing rotation of the treaded line screw, and wherein the rotation of the threaded line screw causes linear motion of the drive tube via the threaded fitting, and the drive tube motion causes tensioning of the brake cable; and a cable tension sensor comprising an activation switch, the activation switch coupled to the control module,
such that the activation switch effects control of the tensioning of the brake cable; a button for activating the activation switch; and a tension resistor for opposing the tensioning of the cable, wherein the tension resistor is positioned such that the activation of the activation switch by the button variably occurs depending on the tensioning of the brake cable.

20. The brake controller of claim 19, wherein the tension resistor has a maximum tensioning resistance, and wherein the tension resistor is positioned such that the button continually activates the activation switch until the tensioning of the brake cable exceeds the maximum tensioning resistance of the tension resistor.

21. A method of installing an electrically powered brake unit for a vehicle having a brake cable and brake, wherein the brake cable is connected to the brake such that tensioning of the brake cable effects application of the brake; and wherein the electrically powered brake unit includes a brake initiator for initiating brake application; a brake controller; an electric motor having a current, the current varying with a load applied to the electric motor; a control module coupled to the electric motor for controlling the electric motor; a current sensor for sensing the current of the electric motor, the current sensor being coupled to the control module; a position sensor is coupled to the control module for determining motion of the brake cable; and a brake tensioner connected to the electric motor, the brake tensioner for tensioning the brake cable; comprising:

attaching the electrically powered brake unit to the vehicle;

connecting the brake cable to the brake tensioner; and initiating brake application using the brake initiator;

wherein upon initiating brake application, the control module controls the electric motor such that the electric motor operates and operation of the electric motor causes the brake tensioner to tension the brake cable, wherein the brake cable is tensioned, applying the brake; the control module stopping the electric motor upon the current of the electric motor reaching a predetermined current; and wherein the control module controls the electric motor such that the electric motor causes a motion in the brake cable; wherein the brake is released by the motion of the brake cable; and wherein the motion of the brake cable being determined using the position sensor, such that the brake cable motion equals a predetermined motion distance for the vehicle.

22. The method of claim 21, wherein the brake initiator comprises a switch, the switch being operable by a user.

23. A brake controller for a vehicle having a brake cable and brake, wherein the brake cable is connected to the brake such that tensioning of the brake cable effects application of the brake, comprising, in combination:

an electric motor having an output shaft;

a control module coupled to the electric motor for controlling the electric motor;

a gear train assembly connected to the electric motor output shaft, the gear train assembly including a threaded line screw;

a drive tube having a first end and a second end, the first end of the drive tube having a threaded fitting for receiving the threaded line screw of the gear train assembly and the second end having an attachment point for attaching the brake cable to the drive tube;

wherein the control module controls the electric motor such that the output shaft of the electric motor causes motion of the gear train assembly, thereby causing rotation of the treaded line screw, and wherein the rotation of the threaded line screw causes linear motion of the drive tube via the threaded fitting, and the drive tube motion causes tensioning of the brake cable; and a strut that includes a channel structure, the strut attachable to the vehicle, wherein the electric motor and gear train assembly is attached to the strut, the strut allowing smooth movement and uniform tensioning of the brake cable.

24. A brake control system for a vehicle having a brake cable and brake, the brake cable being connected to the brake such that tension applied to the brake cable effects application of the brake, comprising, in combination:

an electric motor;

a brake tensioner connected to the electric motor, the brake tensioner for tensioning the brake cable;

a control module coupled to the electric motor for controlling the electric motor, the control module being further coupled to the current sensor;

a tension sensor coupled to the control module for determining the tensioning of the brake cable, the tension sensor determining a threshold tension;

wherein the control module effects application of the brake by controlling the electric motor such that the electric motor causes the brake tensioner to tension the brake cable; wherein the brake cable applies the brake as the brake cable is tensioned; and wherein the control module stops the electric motor upon the tensioning of the electric motor reaching the threshold tension, the reaching of the threshold tension being determined using the tension sensor; and a position sensor coupled to the control module for determining motion of the brake cable;

wherein the control module controls the electric motor so as to operate the electric motor such that the electric motor causes the brake tensioner to release the brake; and wherein the brake is released by motion of the brake cable, the motion of the brake cable being determined using the position sensor.

25. A method for operating a brake for a vehicle having a brake controller, the brake controller including an electric motor having a current, the current varying with load applied to the electric motor; a control module coupled to the electric motor for controlling the electric motor, a current sensor for sensing the current of the electric motor; the current sensor coupled to the control module; a position sensor coupled to the control module for determining motion of the brake cable, and a brake tensioner for tensioning the brake cable, the brake tensioner connected to the electric motor, comprising the steps of, in combination:

receiving a signal to apply the brake;

the control module controlling the electric motor such that the electric motor causes the brake tensioner to tension the brake cable, wherein the brake cable is tensioned, applying the brake;

the control module stopping the electric motor upon the current of the electric motor reaching a predetermined current;

receiving a signal to release the brake; and the control module controlling the electric motor such that the electric motor produces motion in the brake cable; wherein the brake is released by motion of the brake cable, the motion of the brake cable being determined using the position sensor, such that the brake cable motion equals a predetermined motion distance for the vehicle.

26. A brake controller for a vehicle having a brake cable and brake, wherein the brake cable is connected to the brake such that tensioning of the brake cable effects application of the brake, comprising, in combination:

an electric motor having an output shaft;

a control module coupled to the electric motor for controlling the electric motor;

a gear train assembly connected to the electric motor output shaft, the gear train assembly including a threaded line screw;

a drive tube having a first end and a second end, the first end of the drive tube having a threaded fitting for receiving the threaded line screw of the gear train assembly and the second end having an attachment point for attaching the brake cable to the drive tube;

wherein the control module controls the electric motor such that the output shaft of the electric motor causes motion of the gear train assembly, thereby causing rotation of the treaded line screw, and wherein the rotation of the threaded line screw causes linear motion of the drive tube via the threaded fitting, and the drive tube motion causes tensioning of the brake cable;

a cable motion sensor coupled to the control module;

wherein the cable motion sensor senses an amount of change of position of the cable; and wherein the brake is releasable by a predetermined change of position of the cable, the predetermined amount of change of position of the cable being determined by the control module by input from the cable motion sensor;

a switch for activating the brake controller;

a vehicle speed sensor coupled to the control module; and a speed comparator for comparing the vehicle speed to a predetermined speed;

wherein the switch is operatively variably actuable when the vehicle speed is at least the predetermined speed, such that the drive tube motion causes tensioning of the brake cable only during operative actuation of the switch, and wherein the brake is released by the predetermined amount of change of position of the cable upon termination of the operative actuation of the switch.

* * * * *